Figure 1:
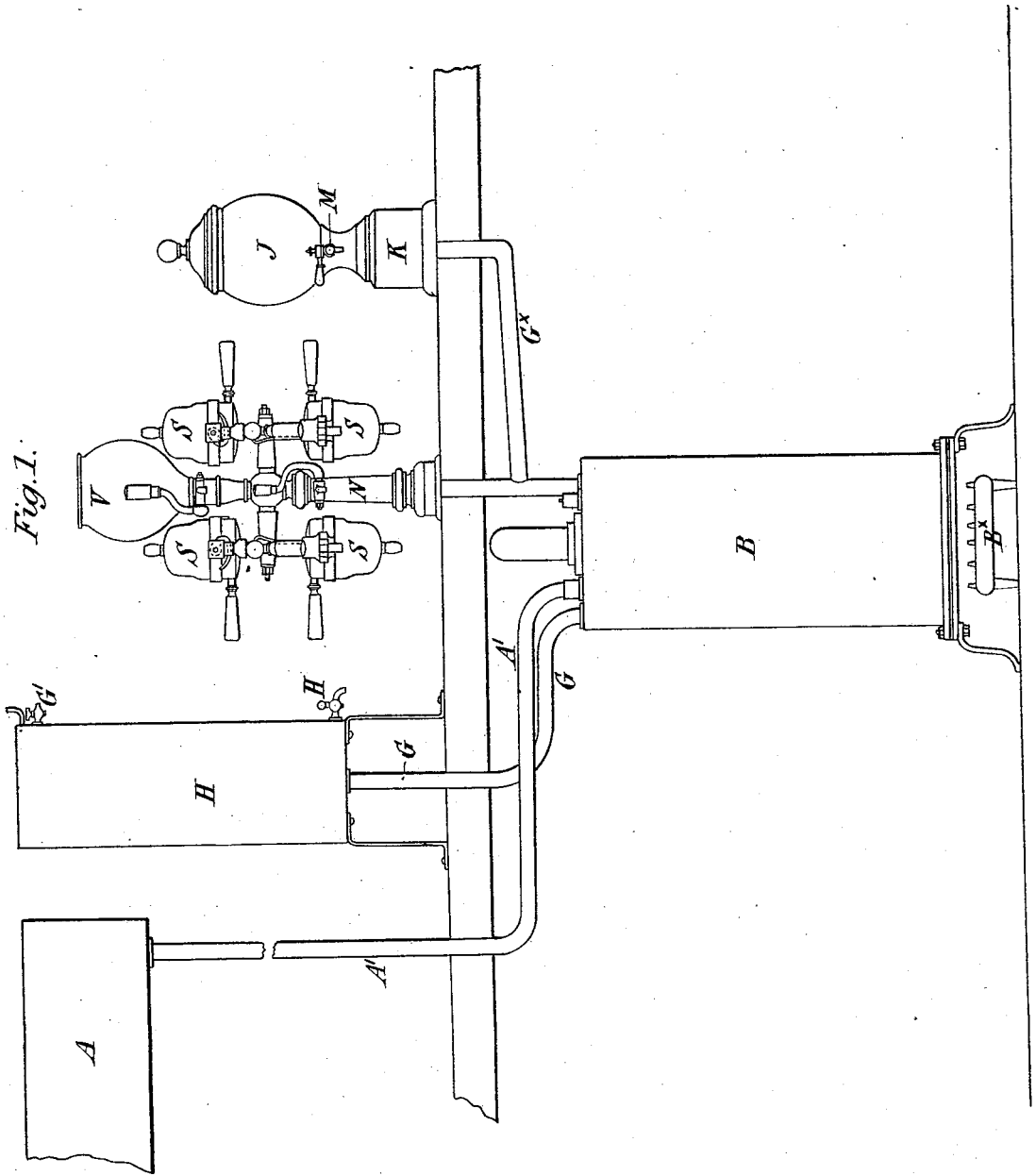

(No Model.) 3 Sheets—Sheet 1.
J. CHILDS & C. J. JONES.
APPARATUS USED IN MAKING INFUSIONS AND MAINTAINING SUPPLIES OF HOT WATER OR LIQUIDS.

No. 521,229. Patented June 12, 1894.

Witnesses
B. W. Miller
Baltus D. Long.

Inventors
James Childs,
Charles John Jones,
by their attys
Baldwin Davidson Wight.

(No Model.) 3 Sheets—Sheet 2.

J. CHILDS & C. J. JONES.
APPARATUS USED IN MAKING INFUSIONS AND MAINTAINING SUPPLIES OF HOT WATER OR LIQUIDS.

No. 521,229. Patented June 12, 1894.

Witnesses
B. W. Miller
Baltus D. Long

Inventors
James Childs,
Charles John Jones,
By their Attys
Baldwin Davidson & Wight

THE NATIONAL LITHOGRAPHING COMPANY,
WASHINGTON, D. C.

(No Model.) 3 Sheets—Sheet 3.

J. CHILDS & C. J. JONES.
APPARATUS USED IN MAKING INFUSIONS AND MAINTAINING SUPPLIES OF HOT WATER OR LIQUIDS.

No. 521,229. Patented June 12, 1894.

Witnesses
B. W. Miller
Baltus D. Long

Inventors
James Childs
Charles John Jones
By their Attys
Baldwin Davidson Wight

THE NATIONAL LITHOGRAPHING COMPANY,
WASHINGTON, D. C.

UNITED STATES PATENT OFFICE.

JAMES CHILDS AND CHARLES JOHN JONES, OF LONDON, ENGLAND.

APPARATUS USED IN MAKING INFUSIONS AND MAINTAINING SUPPLIES OF HOT WATER OR LIQUID.

SPECIFICATION forming part of Letters Patent No. 521,229, dated June 12, 1894.

Application filed September 5, 1893. Serial No. 484,825. (No model.) Patented in England May 17, 1892, No. 9,377, and in France March 31, 1893, No. 229,038.

*To all whom it may concern:*

Be it known that we, JAMES CHILDS, gentleman, residing at Heathcroft, Putney Hill, London, in the county of Surrey, and CHARLES JOHN JONES, engineer, residing at 24 Eastcheap, in the city of London, England, subjects of the Queen of Great Britain, have invented certain new and useful Improvements in Apparatus Used in the Making of Infusions and Maintaining a Supply of Hot Water or Liquid, (for which we have received Letters Patent in Great Britain, No. 9,377, dated May 17, 1892, and in France, No. 229,038, dated March 31, 1893,) of which the following is a specification.

Our invention relates to apparatus used in refreshment rooms for making infusions such as tea or coffee and for maintaining a supply of hot milk, or a supply of hot water for washing up plates or cups or for like purposes.

In many respects we construct the apparatus in a similar manner to the arrangement of apparatus described in prior Patents Nos. 409,360, 417,189, 411,037 and 423,127.

Our present improvements relate to perfecting the various parts of the apparatus and are shown in the drawings annexed.

Figure 2:
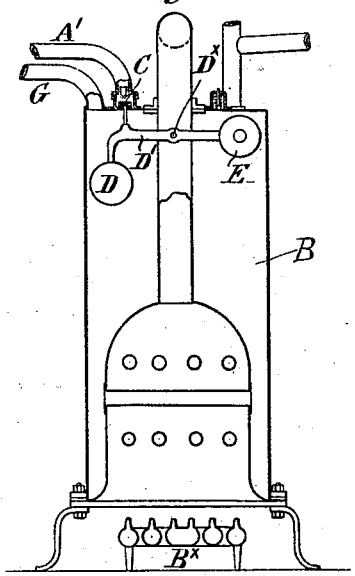
Figure 3:
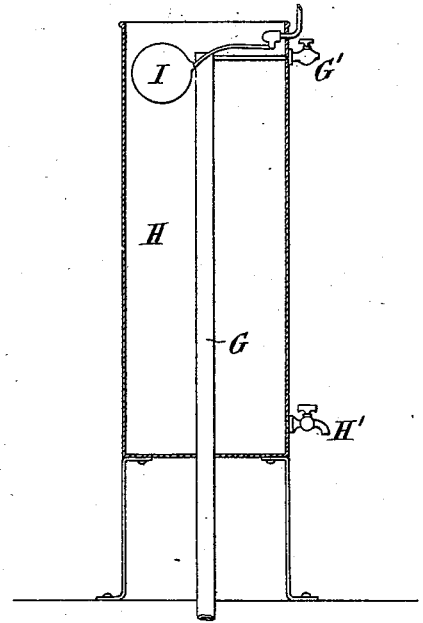
Figure 4:
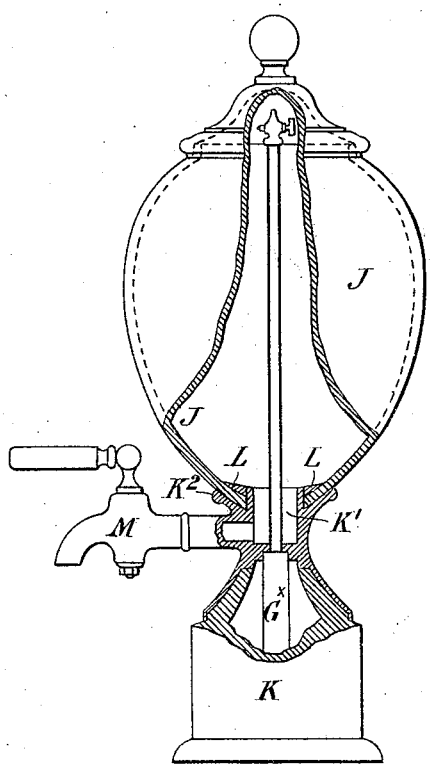
Figure 5:
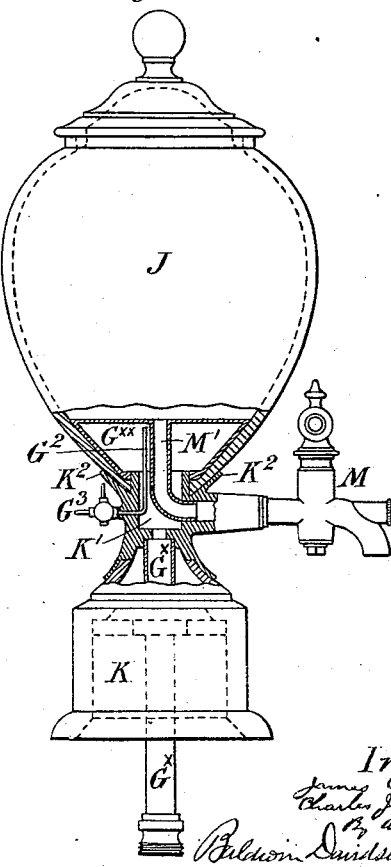
Figure 6:
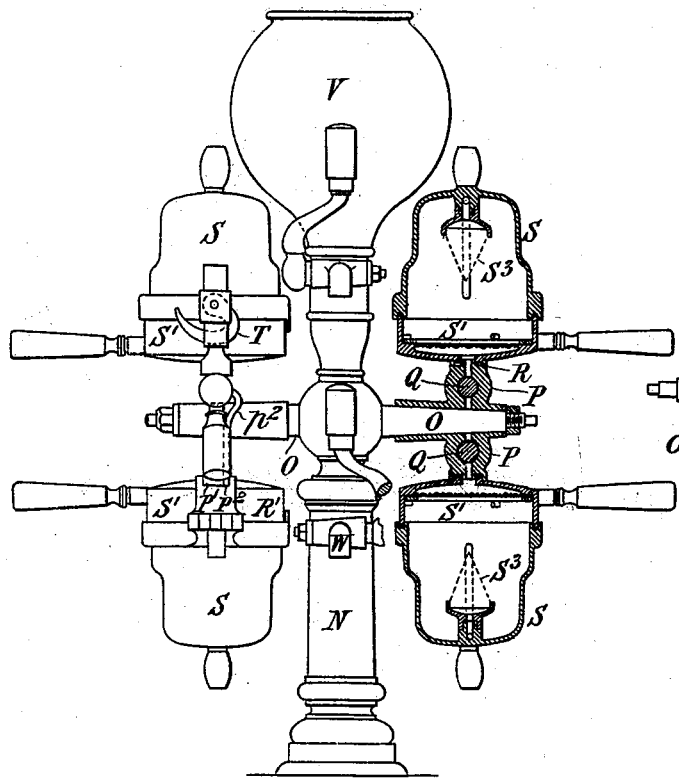
Figure 7:
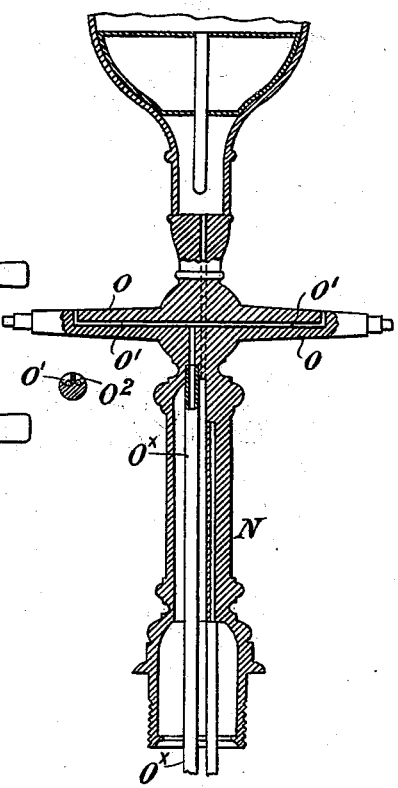
Figure 8:
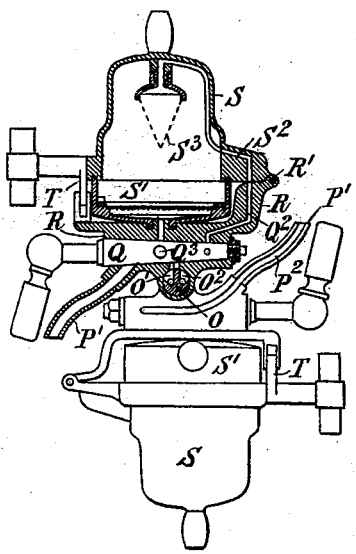
Figure 9:
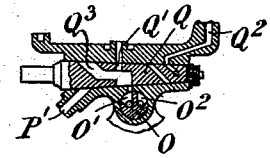
Figure 10:
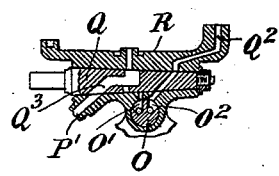

Figure 1 is an elevation of the apparatus. Fig. 2 is a vertical section of the boiler on a larger scale. Fig. 3 is a vertical section of the vessel used for maintaining a supply of hot water. Fig. 4 is an elevation partly in section of an urn used for holding a supply of heated liquid as for example milk. Fig. 5 is a similar view showing a modified construction of this urn. Fig. 6 is a front elevation of the apparatus used for making infusions. Fig. 7 is a vertical section through the standard of this apparatus. Fig. 8 is an elevation partly in section of one pair of the infusion making vessels taken at right angles to Fig. 5. Figs. 9 and 10 are sections showing the plug of the top of one of the vessels in two positions—one in position for filling, the other for emptying the vessel.

In Fig. 1 A is an elevated water supply cistern from which a pipe A' passes to the top of the small steam boiler B which is kept heated by a gas burner $B^\times$ below it as described in Patent No. 409,360. C is a valve at the lower end of the pipe A'.

D is a block of stone or porcelain or like material secured to the end of one arm of a lever D' which is pivoted at $D^\times$ within the upper part of the boiler. When this lever arm is pressed upward it bears against the lower end of the stem of the valve C and keeps the valve closed.

E is a weight secured to the opposite arm of the lever D' counterbalancing the weight of D to such an extent that D will act as a float. When the level of water in the boiler is lowered the valve opens and admits water from the elevated cistern above—the elevation being sufficient for the pressure of water to overcome the slight pressure maintained in the boiler. When the water level in the boiler has risen sufficiently the float D causes the lever D' to close the valve and its flotation power is sufficient to hold the valve closed against the pressure of the water in the pipe A'.

H is an urn or vessel (shown separately on a larger scale at Fig. 3) in which a continuous supply of water may be kept heated say to about 180° or 190° Fahrenheit by a steam pipe G rising up into it from the steam space of the boiler B below—any water condensing in the pipe G will flow back directly to the boiler and the contents of the vessel H will be kept heated without any escape of steam or condensed water from the boiler.

G' is a small tap at the top of the pipe G by which air may be allowed to escape from it.

I is a ball cock for controlling the supply of water to the vessel H and H' is a tap by which hot water may be drawn off from this vessel.

One great advantage of keeping the contents of urns or vessels heated in this way is that the urns or vessels may be of glass or porcelain or like material and their contents kept heated without the transmission of heat through the material of which the vessel is formed and there is therefore less loss of heat than when the vessels are heated by exterior steam jackets.

J is an urn preferably of porcelain adapted for holding a supply of hot milk—this urn is shown separately on a larger scale at Fig. 4 the milk being kept heated in the way above described.

K is a short pedestal by which the urn is carried—a short tube K' projecting up from the top of the pedestal passes up through a hole in the bottom of the urn J. The urn rests on a flange $K^2$ projecting out from this tube and a ring L is screwed on to the top of the tube and holds the urn securely.

$G^x$ is a steam pipe rising up through the pedestal K and urn J and kept supplied with steam from the steam boiler as shown in Fig. 1.

M is a tap standing out from the short tube K' by which the contents of the urn can be drawn off.

In place of the steam pipe $G^x$ being made to rise up to the top of the urn as shown in Fig. 4 a steam chamber may be formed within the interior of the lower part of the urn as in the modified construction shown at Fig. 5. In this figure $G^{xx}$ is the steam chamber fitting closely to the bottom of the interior of the urn.

The bottom of the steam chamber screws on to the top of the short tube K' and holds the urn down on to the flange $K^2$ which projects from the exterior of the tube. A pipe M' passes up through the steam chamber from the draw off cock M to allow of the contents of the urn being drawn off and steam is admitted to the short tube K' and so to the steam chamber through the steam supply pipe $G^x$. To allow of air being drawn off from the steam chamber a small pipe $G^2$ is led down from the interior of this chamber and through the short tube K' to a small tap $G^3$ which stands out from the side of this tube.

The infusion making apparatus is carried by a standard which in the construction shown has two horizontal joint pins O extending from it in opposite directions. The object in mounting the infusion making apparatus upon joint pins is to allow of the vessels being rocked or inverted while the infusions are being made. In each joint pin are two passages O' $O^2$. The passage O' is kept supplied with boiling water through a pipe $O^x$ which descends to below the level of the water in the steam boiler and the other $O^2$ is supplied with steam from the interior of the standard N which is open to the steam space of the boiler. The shell P which turns around each joint pin O is formed to receive the plugs Q, of two other taps at right angles to the joint pin O and on opposite sides of it and beyond each of the plugs Q the shell is formed as a seat R for carrying one of the infusion vessels.

The upper part S of the infusion vessel is hinged at R' to the seat R—the lower part S' of the infusion vessel is placed loosely on to the seat R; the upper part is shut down over it and locked by the catch T. P' are nozzles through which liquid is drawn off from the vessel.

The material to be infused is placed on a perforated false bottom of the part S' when the vessel is in a vertical position above the joint pin O. The vessel is then closed and boiling water admitted to it by turning the plug of its tap Q into the position shown at Fig. 8. Boiling water then passes from the passage O' of the plug O through the small passage Q' of the plug Q to the interior of the infusion vessel below the perforated false bottom of the part S'. At the same time air is allowed to escape from the interior of the vessel through the passage $S^2$ and passage $Q^2$ in the plug to a small passage $P^2$ led along the draw off nozzle P'. When water commences to pass from the passage $P^2$ it is known that the proper quantity of water has passed into the infusion vessel and a quarter turn is given to the plug Q which brings it into the position shown in Fig. 9—all the passages formed through the plug are then closed. The pair of infusion vessels can now be turned on the joint O so as to bring the vessel which has been filled with boiling water into a position below the joint pin—so inverting the vessel and thoroughly mixing any of the ground material from which the infusion is being made and which might previously have been floating on the top of the water thoroughly with the water. The ground material is prevented from passing into the passage $S^2$ by a fine perforated grating $S^3$ as shown. Afterward the vessel may be turned back to its former position and when the infusion is ready it may be drawn off through the nozzle P' by giving a further quarter turn to the plug of the tap Q to bring it into the position shown in Fig. 10. Liquid then passes off through the passage $Q^3$ in the plug to the nozzle while at the same time steam can pass to the top of the vessel from the passage $O^2$ in the joint pin O so that the infusion is forced out by the pressure of steam above it.

V is an urn or vessel for containing a supply of milk to be kept heated. Its construction is the same as that shown in Fig. 4.

What we claim is—

1. The combination of a standard provided with a joint pin formed with passages communicating with supplies for steam and boiling water, a shell or block supported on said joint pin and adapted to be rocked or turned around it, an infusion vessel carried by said shell or block, and provided with passages for the entrance and escape of steam, boiling water and air, and a plug or tap in the shell or block provided with passages for controlling the passages to steam and boiling water to the infusion vessel, substantially as described.

2. The combination of a shell or block, an infusion vessel, carried thereby, a joint pin on which the shell or block is mounted and about which the infusion vessel may be turned, steam and water passages formed in the joint pin, a plug arranged in the shell or block and formed with passages communicating with the passages in the joint pin and passages leading from the plug to the infusion vessel.

3. The combination of a steam boiler B, an urn or vessel for containing liquid arranged at a higher level than the steam boiler, a steam pipe passing from the top of the boiler B, and rising up into the interior of said urn or vessel to heat the contents thereof, and a cock at the upper end of the steam pipe for the escape of air, substantially as described.

JAMES CHILDS.
CHARLES JOHN JONES.

Witnesses:
W. M. HARRIS,
17 Gracechurch Street, London.
JOSEPH LAKE,
17 Gracechurch Street, London, E. C.